Jan. 21, 1941.                D. SILVERMAN                2,229,604
                              ELECTRICAL LOGGING
                              Filed Aug. 19, 1940          2 Sheets-Sheet 1
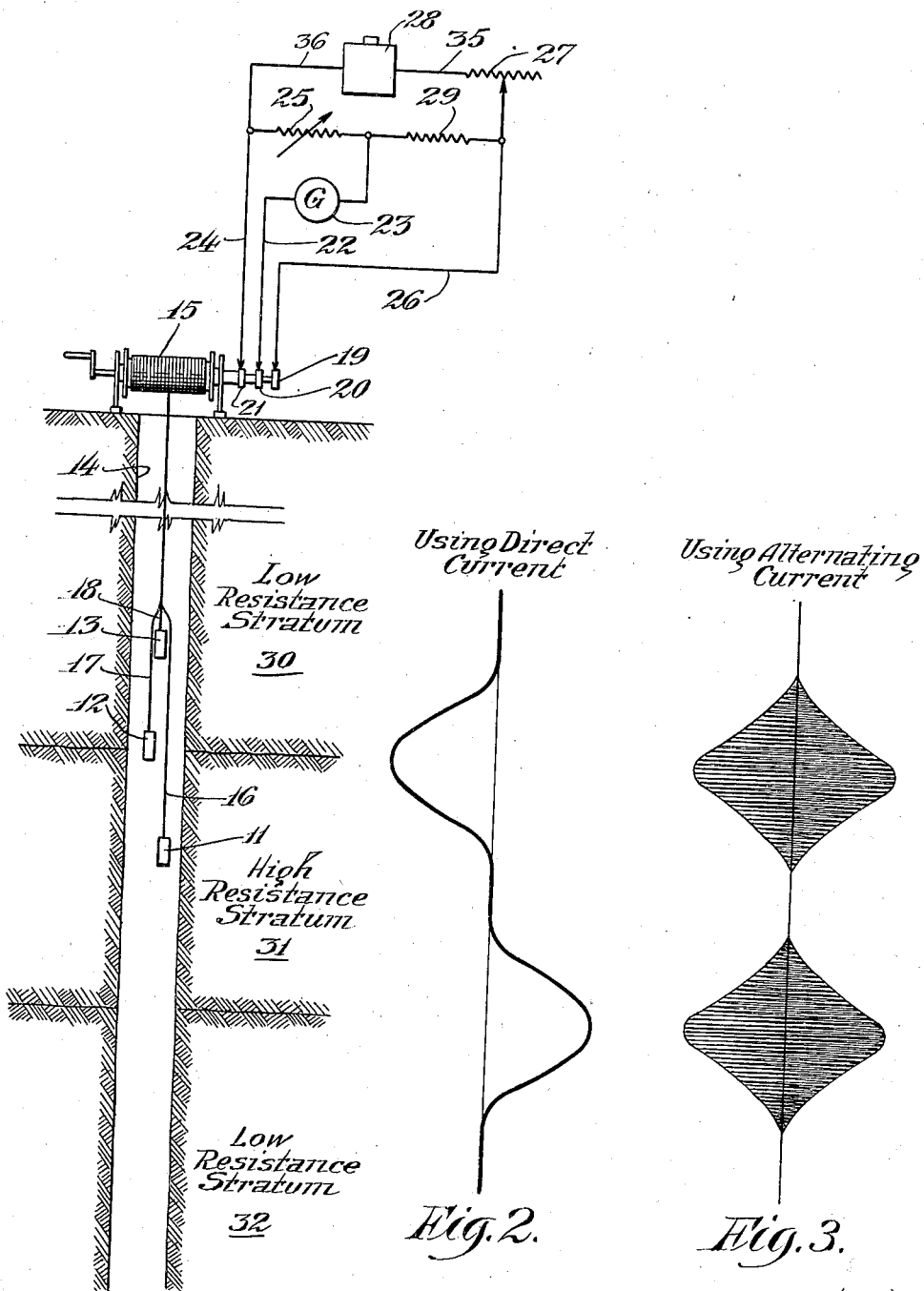

Jan. 21, 1941.　　　D. SILVERMAN　　　2,229,604
ELECTRICAL LOGGING
Filed Aug. 19, 1940　　　2 Sheets-Sheet 2

Inventor:
Daniel Silverman
By Geo. L. Parkhurst
Attorney

Patented Jan. 21, 1941

2,229,604

UNITED STATES PATENT OFFICE 2,229,604

ELECTRICAL LOGGING

Daniel Silverman, Tulsa, Okla., assignor to Stanolind Oil and Gas Company, Tulsa, Okla., a corporation of Delaware Application August 19, 1940, Serial No. 353,232

8 Claims. (Cl. 175—182)

This invention relates to methods and apparatus for well logging and particularly to recording systems for electrical logging of wells.

Various methods and apparatus are well known for the electrical logging of wells, especially the electrical logging of oil and gas wells. In these systems an electric current, either alternating or direct, is passed between an electrode lowered into a well and another electrode spaced from the first one and located either in the well or in contact with the surface of the ground. The effect of the geological strata traversed by the well on the current thus set up is measured using the same electrodes, one of the same electrodes and an additional electrode, or completely different electrodes. While the simplest of these systems utilizes one well electrode and one surface electrode or alternatively two well electrodes, other systems are known to the art using three or more electrodes and the present invention is applicable to any of them.

Electrical logging systems known to the prior art utilize, as above mentioned, either direct current or alternating current. Both alternating current and direct current systems have their advantages and likewise both have their disadvantages.

Thus in the use of direct current there is the advantage, as will hereinafter appear, that the records are more significant. On the other hand, there is the disadvantage that the hydrogen ion concentration at the electrodes has an effect on the readings, or in other words that direct current electrodes are subject to polarization. This difficulty can be overcome to some extent by the use of porous pot electrodes but such electrodes are both cumbersome and troublesome.

The use of alternating current eliminates the polarization problem and also makes it possible to utilize the same electrodes for the determination of some function of the resistivities or relative resistances of the strata traversed by the well and for the determination of the so-called natural potential of the strata or some function thereof. On the other hand, the use of alternating current has a very serious disadvantage, hereinafter pointed out in detail, that the records are less significant than in the case of the use of direct current and in particular that it is impossible with otherwise satisfactory prior art alternating current systems to tell whether the well electrode is passing from a stratum of low resistance to one of high resistance or conversely from one of high resistance to one of low resistance.

It is an object of my invention to overcome the disadvantages of both the direct current and the alternating current systems of electrical logging and to combine the advantages of those two types of systems.

It is also an object of my invention to provide a method and apparatus for electrical logging applying an alternating current to the earth formations and recording resulting earth currents using a direct current system in a particularly advantageous manner.

Another object of my invention is to provide an improved system for measuring a function of the resistance of earth formations as well as a function of the natural potentials of said earth formations.

Other and more detailed objects, advantages and uses of my invention will become apparent as the description thereof proceeds.

It will be readily understood by those skilled in the art in the light of the teachings in this specification and the accompanying drawings that my invention can be applied to any type of electrical logging system using two or more electrodes, one of which can be a surface electrode if desired, and at least one of which is a well electrode. It will be described, however, as applied to the type of electrical logging systems shown in United States Patent No. 2,206,891, issued in the name of Paul F. Hawley on July 9, 1940, and known as the differential resistance system.

This embodiment of my invention will now be described with particular reference to the accompanying drawings in which like reference characters represent like or corresponding parts and in which:

Figure 1 illustrates the type of electrical logging system described in the aforementioned Hawley patent;

Figure 2 shows the type of record obtained using the apparatus of Figure 1 with direct current;

Figure 3 shows the type of record obtained using the apparatus of Figure 1 with alternating current;

Figures 4, 5:
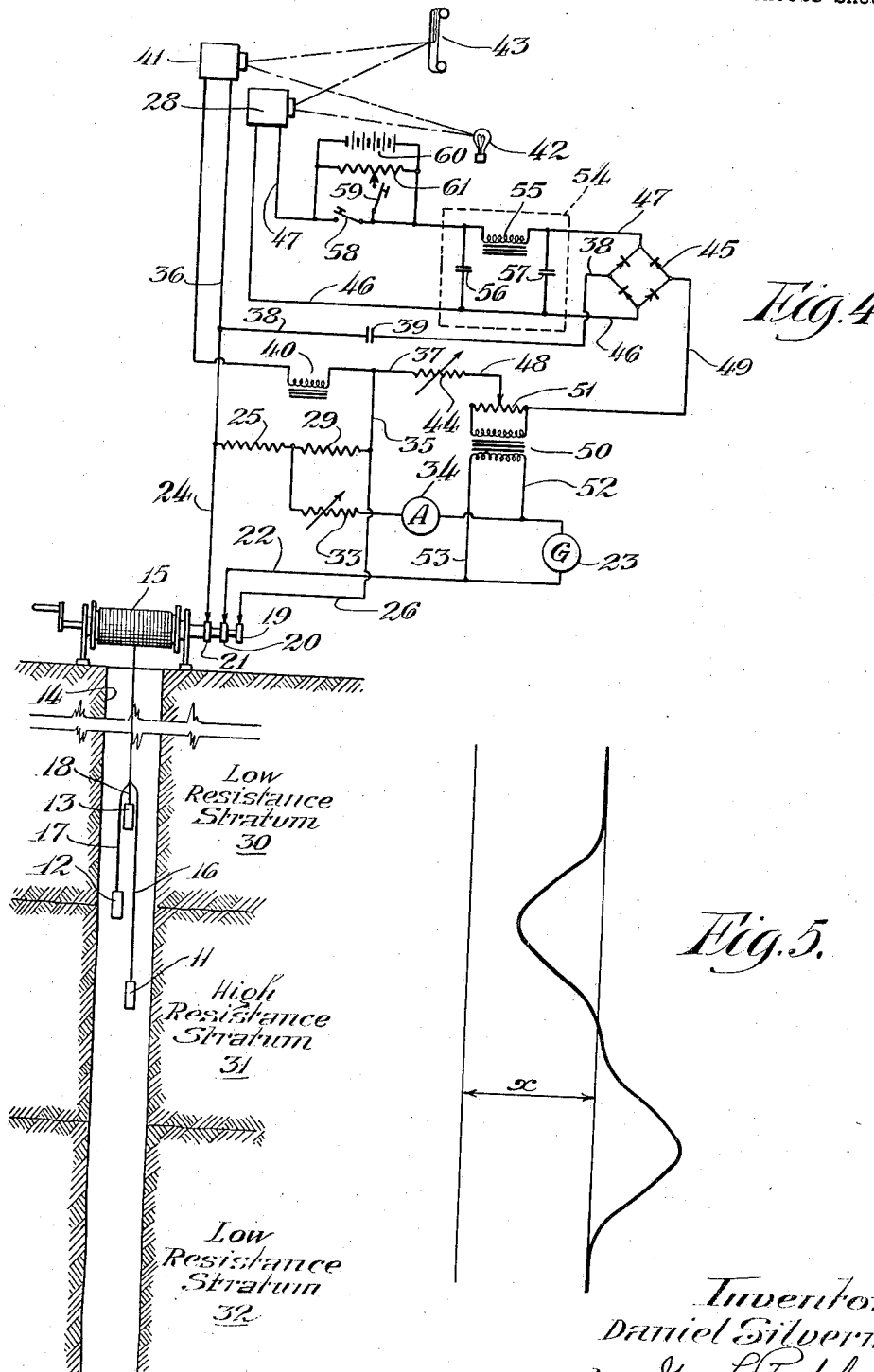
Figure 4 shows the apparatus of Figure 1 modified in accordance with my invention.
Figure 5 shows the type of record obtained using the apparatus of Figure 4.

Turning to Figure 1, the differential resistance system shown includes an array of three vertically spaced electrodes 11, 12 and 13 suspended in a well 14. These electrodes are preferably equally spaced. They may suitably be made of metal and when well 14 is dry at the levels to be logged these electrodes can be arranged to make direct contact with the walls of the well. The electrodes can be raised and lowered within well 14 by use of hoist 15.

Insulated leads 16, 17 and 18, which can all be embodied in the same three conductor cable if desired, pass over hoist 15 to slip rings 19, 20 and 21. Through slip ring 20 the middle electrode 12 is connected by means of an electrical conductor 22 to one pole of a source of electromotive force 23 which can be a direct current or alternating current generator or, when direct current is used, can be a battery. Upper electrode 13 is connected by means of electrical conductor 18, slip ring 21 and electrical conductor 24 through resistance 25 with the other pole of the source of electromotive force 23, and the lower electrode 11 is similarly connected through electrical conductor 16, slip ring 19 and electrical conductor 26 through resistance 29 to source 23.

A detecting device 28, which can take the form of a galvanometer or the like when direct current is used, or a milliammeter, vibration galvanometer, or oscillograph when alternating current is used, is connected across resistances 25 and 29 through adjustable resistance 27. Detecting device 28 is preferably of the recording type arranged so that the current flowing therethrough is recorded as a function of the depth of the electrode system. The purpose of resistance 27 is to regulate the amount of current flowing through detecting device 28 so that the sensitivity and consequently the detail of the records produced may be varied for different conditions.

It will be readily seen that this apparatus comprises a Wheatstone bridge with resistances 25 and 29 as two of the arms thereof, the resistances between electrodes 11 and 12 and electrodes 12 and 13 as the other two arms of the bridge, the source of electromotive force 23 across one diagonal and detecting device 28 across the other diagonal. The resistances are proportioned so that under conditions of use no current will flow to detecting device 28 when the electrical characteristics of the formations between electrodes 11 and 12 and electrodes 12 and 13 are the same. Under such conditions it is apparent that when these electrodes are equally spaced, the resistances between them are equal and resistances 25 and 29 will be equal. One of these resistances can suitably be made variable for adjustment purposes, particularly when the electrode spacing is unequal, and resistance 25 is shown as being variable.

Since the bridge is balanced when the formations intercepted by the electrodes have the same electrical characteristics, it is apparent that when formations of other characteristics are encountered, the resistance between electrodes 11 and 12 will change (if the array is being lowered), the Wheatstone bridge will become unbalanced and a current will flow through detecting device 28.

In carrying out the logging operation using apparatus of the type shown in Figure 1, well 14 is preferably filled with an electrically homogeneous fluid such as drilling mud or water. The fluid which is present in the well during a drilling operation is usually quite satisfactory unless it has been allowed to stand undisturbed so long that stratification has occurred. The vertically spaced electrodes 11, 12 and 13 are then lowered by means of hoist 15 into well 14, preferably at a substantially constant rate. Alternatively the electrodes can be raised, or runs can be made in both directions in order to check results. As long as the formations traversed have the same resistivity no current will flow through detecting device 28, but if the lower electrode 11 enters a zone in which the formation has a higher resistivity, the resistance between electrodes 11 and 12 becomes greater than that between electrodes 12 and 13 and current will therefore flow through detecting or recording device 28. Similarly when a zone of relatively lower resistivity is entered by electrode 11, current will flow through device 28, but in the opposite direction.

It is apparent that the greatest difference in resistance between electrodes 11 and 12 and electrodes 12 and 13 will occur when middle electrode 12 is at the boundary level between two dissimilar formations, and that detecting device 28 will give a maximum reading at that point. It is preferred, therefore, that the record made by device 28 show the amount of current flow plotted against the position of middle electrode 12 in the well.

As illustrated in Figure 1 the middle electrode 12 is located opposite the interface between an upper low resistance stratum 30 and a high resistance stratum 31. Below this high resistance stratum is a second low resistance stratum 32.

If generator 23 is a direct current generator (or a battery) the type of record obtained by raising and lowering the array of electrodes past the three strata 30, 31 and 32 is shown in Figure 2. When the array passes from a low resistance stratum to a high resistance stratum there is a deflection in one direction while when the array passes from a high resistance stratum to a low resistance stratum there is a deflection in the other direction.

If alternating current is used, or if, in other words, generator 23 is an alternating current generator, and detecting device 28 is a high frequency galvanometer or oscillograph element, the resultant voltage-depth chart or record will be as shown in Figure 3. In other words, there will merely be bands of dark showing where the galvanometer has deflected both ways during each cycle of the alternating current. As the rate of lowering or raising the electrodes is necessarily very low compared to the frequency of the alternating current, each successive cycle is practically superimposed on the previous one and all that it is possible to determine from the resulting record or log is the fact that there were two interfaces present. No idea can be obtained as to the type of change of strata because no polarity of the swings of the deflection can be observed.

When the array of electrodes passes from a stratum of low resistance to one of high resistance the current in each cycle is in phase with the applied voltage while during the passage from a high resistance stratum to a low resistance stratum the recording current is opposite in phase to the applied voltage. The reason why this is so follows, of course, from consideration of the direct current case shown in Figure 2. On the other hand, it is not possible with the usual alternating current recording systems to differentiate between the case in which the recording current and applied voltage are in phase and the case in which they are out of phase. My invention, on the other hand, provides a method for distinguishing between these two different situations, thereby making it possible to tell not only that one is encountering a difference in resistance between two strata but also the type of difference encountered; namely, whether it is an increase or a decrease in resistance.

One circuit by which this can be accomplished is shown in Figure 4. In Figure 4 the alternating current passing through the center electrode 12 of the three well electrodes is adjusted by means of variable resistance 33 and can be read by use of meter 34. Preferably this current should be kept constant but no error is introduced by failure to observe this precaution when using the present system of well logging. Accordingly meter 34 can be omitted if desired.

The unbalanced voltage of the bridge circuit due to the electrodes passing the interfaces between strata 30, 31 and 32 appears as in the case of the apparatus shown in Figure 1 across conductors 35 and 36. The alternating current component of this same voltage also appears across conductors 37 and 38 since condenser 39 is of low impedance.

On the other hand, the direct current due to the ground potential or so-called natural potential passes through high inductance choke 40 and recording element 41 and is recorded. This recording element can be of any type, for instance an oscillograph element, on which light is focused from lamp 42 and is transmitted to a moving film or photosensitized strip 43. In actual practice oscillograph element 41 and oscillograph element 28, which will later be described in more detail, can conveniently be two oscillograph strings or oscillograph coils in the same oscillograph. Various features of the oscillograph camera including lens systems and means for moving the film or photosensitized strip 43 are not shown since they are familiar to those skilled in the art.

Variable resistance 44 constitutes a sensitivity control and by use of it all or part of the voltage which appears across conductors 37 and 38 can be passed to rectifier 45 and there rectified. The rectified voltage appears across conductors 46 and 47 and passes to oscillograph element 28. The two oscillograph elements 28 and 41 can make two traces or records on a common moving film or sensitized strip if desired. The record made by oscillograph element 41 will show the natural potential while the record made by oscillograph element 28 will show, in the circuit shown, a function of the differential resistance of the strata traversed by the well electrodes.

If conductors 48 and 49 were directly connected to each other and transformer 50 and potentiometer 51 were omitted the resultant log made by oscillograph element 28 would be the same as that of Figure 3 but with the deflections on one side of the zero axis completely eliminated. Thus it would still be impossible to tell from the record or log whether a given deflection resulted from passage from a low resistance stratum to a high resistance stratum or vice versa.

However, a voltage which has always the same phase with respect to the operating voltage is also applied to the circuit by means of alternating current generator 23, conductors 52 and 53, transformer 50 and, if desired, potentiometer 51. This voltage is greater than the maximum voltage drop across leads 48 and 49 and is constant. When this voltage is rectified by rectofier 45 and applied to recording element 28 a constant deflection shown as $x$ in Figure 5 is produced. The voltage variation across conductors 48 and 49 either adds to or subtracts from the voltage applied by the use of generator 23, conductors 52 and 53, transformer 50 and potentiometer 51 according to whether the phase of the two voltages is the same or opposite. As a result the total voltage which is rectified by the full wave rectifier 45 will be greater or less than the voltage supplied through transformer 50 and potentiometer 51 depending upon the phase as well as the magnitude of the voltage coming from the well electrodes and impressed across conductors 48 and 49. Thus the log resulting from the use of oscillograph element 28 will show a decrease in recording amplitude opposite the first or upper interface as the well voltage is out of phase with the applied voltage and an increase opposite the second or lower interface where the conditions are reversed.

Preferably a low pass filter 54 is included between leads 46 and 47 when recording device 28 is a conventional oscillograph element or other device which is sufficiently sensitive to respond to fluctuations in the rectified voltage impressed upon it. In this way all of the small variations resulting merely from the use of alternating current can be substantially completely eliminated from the record obtained. The low pass filter 54 can be of any suitable type, and as shown consists of choke coil 55 connected in series and condensers 56 and 57 connected in parallel with recorder 28.

As shown in Figure 5 the apparatus as thus far described will result in a record which is displaced as a whole from the zero axis. This is not usually seriously disadvantageous but it is possible to eliminate the constant deflection $x$ by introducing into the direct current part of the circuit leading from full wave rectifier 45 to the recording element 28 a direct current potential which is equal and opposite to the rectified value of the constant alternating voltage from potentiometer 51 and thus reduces this deflection to zero.

This can be accomplished by opening switch 58 and closing switch 59 whereupon a battery or other source of direct current potential 60 and potentiometer 61 are placed in the circuit. Potentiometer 61 can be adjusted until the deflection is zero. When this is done the resulting log will have exactly the appearance of Figure 2. In other words, all of the advantages of the ordinary direct current system are obtained as well as all of the advantages of the use of alternating current including elimination of polarization difficulties and the possibility of recording natural potential using the same electrodes used to record resistance or some function of relative resistance of the strata traversed by the well electrode or array of well electrodes.

While I have described my invention in connection with a specific embodiment thereof, it is to be understood that this is by way of illustration and not by way of limitation and I do not mean to be restricted thereto but only to the scope of the appended claims in which I have defined the novelty inherent in my invention.

I claim:

1. A method of electrical logging comprising passing an alternating current between at least one well electrode and at least one additional electrode in electrical communication with the earth, obtaining in an electrical circuit an alternating current voltage, resulting from the passage of said alternating current between said electrodes, converting said resultant alternating current voltage into a second alternating current voltage indicative of both the magnitude of said resultant alternating current voltage and the phase relationships of said resultant alternating current voltage to said alternating current, rectifying said second alternating current voltage, and applying said rectified voltage to a recorder.

2. A method of electrical logging comprising passing an alternating current between at least one well electrode and at least one additional electrode in electrical communication with the earth, obtaining in an electrical circuit an alternating current voltage, resulting from the passage of said alternating current between said electrodes, adding to said resultant alternating current voltage a second alternating current voltage greater than said resultant alternating current voltage and in phase with said alternating current, rectifying the sum of said alternating current voltages, and recording the summation of said rectified alternating current voltage.

3. A method of electrically logging a well comprising passing an alternating current between at least one well electrode and at least one additional electrode in electrical communication with the earth while varying the level of said well electrode in said well, obtaining in an electrical circuit an alternating current voltage, resulting from the passage of said alternating current between said electrodes, adding to said resultant alternating current voltage a second alternating current voltage greater than said resultant alternating current voltage and in phase with said alternating current, and rectifying and recording the summation of said alternating current voltages as a function of the depth of said well electrode in said well.

4. A method of electrical logging comprising passing an alternating current between at least one well electrode and at least one additional electrode in electrical communication with the earth, obtaining in an electrical circuit a voltage having both an alternating current component resulting from the passage of said alternating current between said electrodes and a so-called natural potential direct current component, recording said direct current component, adding to said alternating current component an alternating current voltage greater than the voltage of said alternating current component and in phase with the first-mentioned alternating current, and rectifying and recording the summation of said alternating current component and said alternating current voltage.

5. A method of electrically logging a well comprising passing an alternating current between at least one well electrode and at least one additional electrode in electrical communication with the earth while varying the level of said well electrode in said well, obtaining in an electrical circuit a voltage having both an alternating current component resulting from the passage of said alternating current between said electrodes and a so-called natural potential direct current component, recording said direct current component as a function of the depth of said well electrode in said well, applying to said alternating current component an alternating current voltage greater than the voltage of said alternating current component and in phase with the first-mentioned alternating current, and rectifying and recording the summation of said alternating current component and said alternating current voltage as a function of the depth of said well electrode in said well.

6. Apparatus for electrical logging comprising at least one well electrode and at least one additional electrode in electrical communication with the earth, means for passing an alternating current between said electrodes, means for obtaining in an electrical circuit an alternating current voltage, resulting from the passage of said alternating current between said electrodes, means for adding to said resultant alternating current voltage a second alternating current voltage greater than said resultant alternating current voltage and in phase with said alternating current, and means for rectifying and recording the summation of said alternating current voltages.

7. Apparatus for electrical logging comprising at least one well electrode and at least one additional electrode in electrical communication with the earth, means for changing the level of said well electrode within the well to be logged, means for passing an alternating current between said electrodes, means for obtaining in an electrical circuit an alternating current voltage, resulting from the passage of said alternating current between said electrodes, means for applying to said resultant alternating current voltage a second alternating current voltage greater than said resultant alternating current voltage and in phase with said alternating current, means for rectifying the summation of said alternating current voltages, and means for recording the rectified summation of said alternating current voltages as a function of the depth of said well electrode in said well.

8. Apparatus for electrically logging a well comprising at least one well electrode and at least one additional electrode in electrical communication with the earth, means for changing the level of said well electrode within said well, means for passing an alternating current between said electrodes, means for obtaining in an electrical circuit a voltage having both an alternating current component resulting from the passage of said alternating current between said electrodes and a so-called natural potential direct current component, means for recording said direct current component, means for adding to said alternating current component an alternating current voltage greater than the voltage of said alternating current component and in phase with the first-mentioned alternating current, and means for rectifying and recording the summation of said alternating current component and said alternating current voltage.

DANIEL SILVERMAN.